(12) United States Patent
Chien et al.

(10) Patent No.: US 9,007,337 B2
(45) Date of Patent: Apr. 14, 2015

(54) TOUCH-SENSING DISPLAY PANEL

(75) Inventors: Yu-Feng Chien, New Taipei (TW);
Tun-Chun Yang, Taipei (TW);
Wei-Ming Huang, Taipei (TW)

(73) Assignee: Au Optronics Corporation, Hsinchu (TW)

( * ) Notice: Subject to any disclaimer, the term of this patent is extended or adjusted under 35 U.S.C. 154(b) by 207 days.

(21) Appl. No.: 13/615,680

(22) Filed: Sep. 14, 2012

(65) Prior Publication Data
US 2013/0147730 A1 Jun. 13, 2013

(30) Foreign Application Priority Data

Dec. 8, 2011 (TW) .............................. 100145313 A

(51) Int. Cl.
*G06F 3/041* (2006.01)
*G06F 3/044* (2006.01)

(52) U.S. Cl.
CPC .............. *G06F 3/0412* (2013.01); *G06F 3/044* (2013.01); *G06F 2203/04103* (2013.01)

(58) Field of Classification Search
CPC ................. G06F 3/0412; G06F 3/044; G06F 2203/04111; G06F 2203/04103
USPC ................. 345/173–174; 178/18.06
See application file for complete search history.

(56) References Cited

U.S. PATENT DOCUMENTS

| 8,052,498 | B2 | 11/2011 | Chien et al. |
| 8,142,250 | B2 | 3/2012 | Chien et al. |
| 2008/0007534 | A1 | 1/2008 | Peng et al. |
| 2008/0309633 | A1 | 12/2008 | Hotelling et al. |
| 2009/0194344 | A1 | 8/2009 | Harley et al. |
| 2010/0136868 | A1* | 6/2010 | Chien et al. ..................... 445/24 |
| 2010/0194699 | A1 | 8/2010 | Chang |
| 2011/0199333 | A1* | 8/2011 | Philipp et al. ................. 345/174 |

(Continued)

FOREIGN PATENT DOCUMENTS

| CN | 101424817 | 5/2009 |
| CN | 101441347 | 5/2009 |

(Continued)

OTHER PUBLICATIONS

"Office Action of Taiwan Counterpart Application", issued on Jun. 16, 2014, p. 1-p. 9.

*Primary Examiner* — Allison Johnson
(74) *Attorney, Agent, or Firm* — Jianq Chyun IP Office

(57) ABSTRACT

A touch-sensing display panel including an active device array substrate, a touch-sensing substrate and a display medium is provided. The touch-sensing substrate includes a first substrate, first touch-sensing electrodes, second touch-sensing electrodes, a dielectric layer and a black matrix. The first touch-sensing electrodes are parallel with each other and disposed on the first substrate. Each of the first touch-sensing electrodes has a plurality of first openings, respectively. Each of the second touch-sensing electrodes has a plurality of second openings, respectively. The second touch-sensing electrodes are intersected with the first touch-sensing electrodes. The black matrix is disposed between the first touch-sensing electrodes and the first substrate and is disposed between the second touch-sensing electrodes and the first substrate, wherein the black matrix has a plurality of pixel openings arranged in array. Each of the pixel openings is corresponding to one of the first openings or one of the second openings, respectively.

17 Claims, 12 Drawing Sheets

(56) References Cited

U.S. PATENT DOCUMENTS

2012/0015464 A1    1/2012   Chien et al.
2012/0105337 A1*   5/2012   Jun et al. .................. 345/173

FOREIGN PATENT DOCUMENTS

| | | |
|---|---|---|
| CN | 101819344 | 9/2010 |
| TW | 201022784 | 6/2010 |

\* cited by examiner

TOUCH-SENSING DISPLAY PANEL

CROSS-REFERENCE TO RELATED APPLICATION

This application claims the priority benefit of Taiwan application serial no. 100145313, filed on Dec. 8, 2011. The entirety of the above-mentioned patent application is hereby incorporated by reference herein and made a part of this specification.

BACKGROUND OF THE INVENTION

1. Field of the Invention

The present invention generally relates to a touch-sensing display panel, and more particularly, to an in-cell type capacitive touch-sensing display panel.

2. Description of Related Art

The increasing progress of display technologies brings about great conveniences to people's daily life. As such, flat panel displays (FPDs) have become popular due to its features of being light and thin. Recently, all type of electronic products are developed toward easy operation, small volume, and large screen, and the demands of the volume and the screen size in the portable products are particularly stringent. Besides, in many electronic products, a touch sensing design is integrated into a display panel, so as to expand the area where the screen is disposed by removing the space for placing the keyboard or the operation buttons.

Generally, touch-sensing display panel includes a plurality of display units and a plurality of touch-sensing units, wherein the plurality of display units constitute a display panel and the plurality of touch-sensing units may be built in the display panel or added on a surface of the display panel. Based on different ways of sensing, touch units are generally categorized into resistant touch-sensing units, capacitive touch-sensing units, optical touch-sensing units, sonic wave touch-sensing units, and electromagnetic touch-sensing units. When the touch-sensing display panel is touched by fingers of users or a stylus, electrical characteristics (e.g. capacitance, current, resistance and so on) of the touch-sensing units located at the position that is touched by fingers or stylus changes. The aforesaid change of electrical characteristics is converted into electrical signal and processed by processor such that an command is output to control electronic devices.

Usually, touch-sensing pads of touch-sensing display panels are fabricated by transparent conductive layer. For example, the material of the transparent conductive layer is indium tin oxide (ITO). The transmittance of the transparent conductive layer ranges from about 90% to 98%. However, the transmittance of the areas outside of the touch-sensing pads is different from the transmittance of the areas occupied by the touch-sensing pads. Specifically, the transmittance of the areas outside of the touch-sensing pads is greater than the transmittance of the areas occupied by the touch-sensing pads. In this case, users may notice the difference of transmittance when using the conventional touch-sensing display panel. Accordingly, the display quality of the conventional touch-sensing display panel deteriorates. Currently, how to integrate touch-sensing units into display panels without deteriorating display quality (e.g. brightness) is an important issue to be solved immediately.

SUMMARY OF THE INVENTION

The disclosure provides a touch-sensing display panel having in-cell type touch-sensing units.

The disclosure provides a touch-sensing display panel comprising an active device array substrate, a touch-sensing substrate and a display medium. The touch-sensing substrate includes a first substrate, a plurality of first touch-sensing electrodes, a plurality of second touch-sensing electrodes, a dielectric layer and a black matrix. The first touch-sensing electrodes are parallel with each other and are disposed on the first substrate. Each of the first touch-sensing electrodes has a plurality of first openings, respectively.

The second touch-sensing electrodes are parallel with each other and are disposed on the first substrate. The second touch-sensing electrodes are between the first substrate and the second substrate. The second touch-sensing electrodes are intersected with and are electrically insulated from the first touch-sensing electrodes. Each of the second touch-sensing electrodes has a plurality of second openings, respectively. The dielectric layer is at least disposed at intersections of the first touch-sensing electrodes and the second touch-sensing electrodes such that the second touch-sensing electrodes are electrically insulated from the first touch-sensing electrodes. The black matrix is disposed between the first touch-sensing electrodes and the first substrate and is disposed between the second touch-sensing electrodes and the first substrate, wherein the black matrix has a plurality of pixel openings arranged in array. Each of the pixel openings is corresponding to one of the first openings or one of the second openings, respectively. The display medium is disposed between the active device array substrate and the touch-sensing substrate.

In an embodiment of the disclosure, the active device array substrate includes a second substrate, a plurality of scan lines, a plurality of data lines and a plurality of pixel electrodes. The scan lines and the data lines are disposed over the second substrate, and the scan lines are intersected with the data lines. The pixel electrodes are disposed over the second substrate, and each of the pixel electrodes is corresponding to one of the pixel openings, respectively. Each of the pixel electrodes is electrically connected to one of the scan lines and one of the data lines correspondingly.

In an embodiment of the disclosure, a dimension of each of the pixel openings is smaller than or substantially equal to a dimension of each of the first openings, and the dimension of each of the pixel openings is smaller than or substantially equal to a dimension of each of the second openings.

In an embodiment of the disclosure, the dimension of each of the first openings is substantially equal to the dimension of each of the second openings.

In an embodiment of the disclosure, each of the first touch-sensing electrodes can be a bar-shaped electrode having the first openings. Each of the second touch-sensing electrodes includes a plurality of touch-sensing pads having the second openings and a plurality of first bridge lines electrically connected between neighboring touch-sensing pads. The first touch-sensing electrodes are intersected with the first bridge lines of the second touch-sensing electrodes. The position of the first bridge lines is corresponding to the position of the black matrix.

In an embodiment of the disclosure, the width of each of the first bridge lines is smaller or substantially equal to the width of the black matrix corresponding thereto.

In an embodiment of the disclosure, the touch-sensing pads and the first bridge lines are fabricated from a same material layer while the first touch-sensing electrodes and the second touch-sensing electrodes are fabricated from different material layers.

In an embodiment of the disclosure, the touch-sensing pads and the first bridge lines are fabricated from different material layers while the first touch-sensing electrodes and the touch-sensing pads are fabricated from a same material layer.

In an embodiment of the disclosure, each of the first bridge lines is intersected with only one of the first touch-sensing electrodes.

In an embodiment of the disclosure, each of the first bridge lines is intersected with at least two of the first touch-sensing electrodes.

In an embodiment of the disclosure, the touch-sensing display panel further includes a plurality of first ground electrodes and a plurality of second ground electrodes. Each of the first ground electrodes is located between two neighboring first touch-sensing electrodes, respectively. Each of the second ground electrodes is located between two neighboring second touch-sensing electrodes, respectively. Each of the first bridge lines is intersected with at least two of the first touch-sensing electrodes and one of the first ground electrodes.

In an embodiment of the disclosure, the first ground electrodes are electrically connected to the second ground electrodes through a plurality of second bridge lines, and the second bridge lines are intersected with the first touch-sensing electrodes.

In an embodiment of the disclosure, the touch-sensing display panel further includes a plurality of ground electrodes. The ground electrodes are located between two neighboring first touch-sensing pads and between the touch-sensing pads and the first touch-sensing electrodes.

In an embodiment of the disclosure, the ground electrodes are electrically connected to each other through a plurality of third bridge lines.

In an embodiment of the disclosure, the touch-sensing display panel further includes a plurality of color filters. The color filters are disposed on the first substrate and arranged corresponding to the pixel openings.

In an embodiment of the disclosure, the first touch-sensing electrodes and the second touch-sensing electrodes are covered by the black matrix entirely.

In an embodiment of the disclosure, the scan lines and the second touch-sensing electrodes extend along a first direction, and the scan lines are substantially overlapped with the second touch-sensing electrodes. In addition, the data lines and the first touch-sensing electrodes extend along a second direction, and the data lines are substantially overlapped with the first touch-sensing electrodes.

In an embodiment of the disclosure, each of the first touch-sensing electrodes has a plurality of first touch-sensing areas, each of the second touch-sensing electrodes has a plurality of second touch-sensing areas, and the first touch-sensing areas are not overlapped with the second touch-sensing areas.

As mentioned above, the touch-sensing electrodes in the touch-sensing display panel is shielded or covered by the black matrix and cannot be viewed by users. In this case, the touch-sensing display panel provides favorable display quality, since the touch-sensing electrodes are not noticed by users.

In order to make the aforementioned and other features and advantages of the invention more comprehensible, embodiments accompanying figures are described in detail below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the invention.

DESCRIPTION OF EMBODIMENTS

Figure 1A:
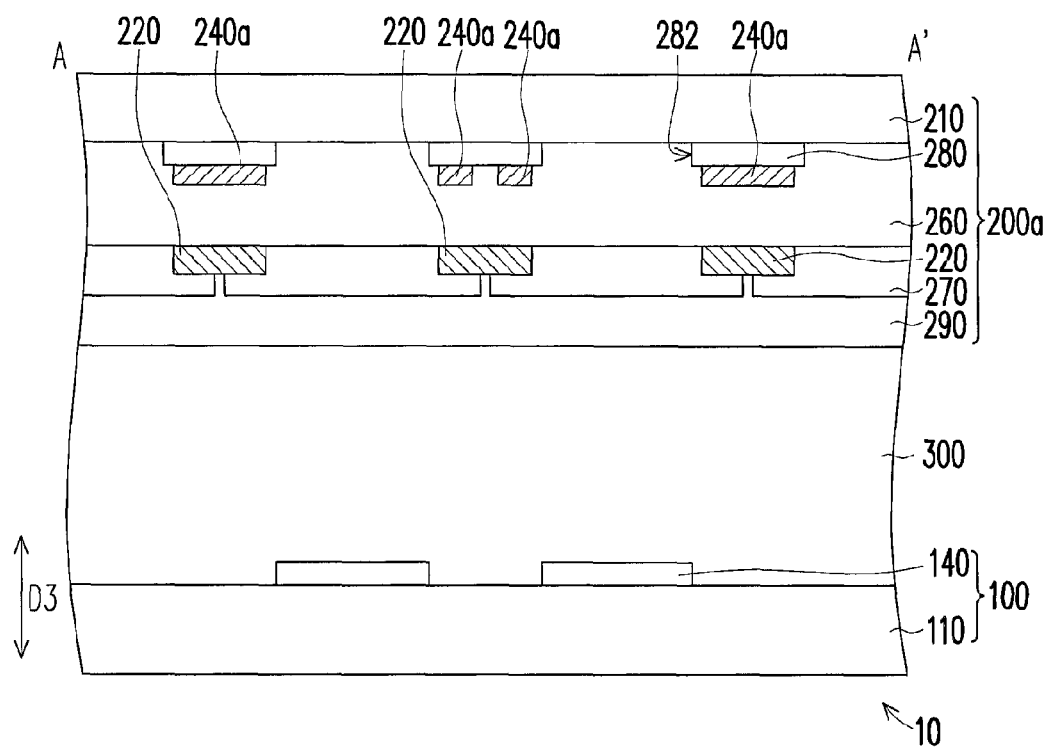
FIG. 1A is a schematic cross-sectional view of a touch-sensing display panel according to the first embodiment of the present invention.

FIG. 1A is a schematic cross-sectional view of a touch-sensing display panel 10 according to the first embodiment of the present invention. Referring to FIG. 1A, the touch-sensing display panel 10 of the present embodiment includes an active device array substrate 100, a touch-sensing substrate 200a, and a display medium 300, wherein the display medium 300 is located between the active device array substrate 100 and the touch-sensing substrate 200a. The touch-sensing substrate 200a includes a first substrate 210, a plurality of first touch-sensing electrodes 220, a plurality of second touch-sensing electrodes 240a, a dielectric layer 260 and a black matrix 280. For example, the first substrate 210 is a glass substrate, a quarts substrate, a plastic substrate, a flexible substrate or a composited substrate constituted by at least two of the glass substrate, the quarts substrate, the plastic substrate and the flexible substrate. The material of the black matrix 280 is, for example, black resin, chromium oxide (CrOx), titanium oxide (TiOx) or the stacked layer of at least two of black resin, chromium oxide (CrOx), titanium oxide (TiOx). Preferably, the black matrix 280 may be formed by material with low reflectivity. It is noted that an anti-reflection layer with low reflectivity may be optionally formed between the black matrix 280 and the first substrate 210. For example, the anti-reflection layer may be multiple coatings of anti-reflection materials. The display medium 300 may be non-self-illuminating materials, self-illuminating materials or the combinations thereof. In this embodiment, the display medium 300 includes liquid crystal materials, electrophoretic materials, organic luminescent materials, inorganic luminescent materials, fluorescence materials, phosphorescence materials, plasma display materials or fluorescence substance coated in pixel structure. In this embodiment, the display medium 300 is liquid crystal material. It should be noted that other types of display medium 300 may be used according to actual design requirements. When the liquid crystal material is used, the touch-sensing display panel 10 is referred to as an LCD panel (e.g. a transmissive display panel, a transflective display panel, a reflective display panel, a micro-reflective display panel, a vertically aligned (VA) display panel, an in-plane switch (IPS) display panel, a multi-domain vertically aligned (MVA) display panel, a twist nematic (TN) display panel, a super twist nematic (STN) display panel, a patterned-silt vertically aligned (PVA) display panel, a super patterned-silt vertically aligned (S-PVA) display panel, an advance super view (ASV) display panel, a fringe field switching (FFS) display panel, a continuous pinwheel alignment (CPA) display panel, an ASM display panel, an OCB display panel, an S-IPS display panel, an axially symmetric aligned micro-cell mode (AS-IPS) display panel, an ultra-fringe field switching (UFFS) display panel, a polymer stabilized alignment (PSA) display panel, a dual-view display panel, a triple-view display panel, a three-dimensional display panel, any other display panel, or a combination thereof. In addition, the touch-sensing display panel 10 may be a micro-capsule electrophoretic display panel, a micro-cup electrophoretic display panel, a top emission OLED/LED display panel, a bottom emission OLED/LED display panel, a dual emission OLED/LED display panel, a plasma display panel (PDP) or a field emission display panel (FED). The detailed materials of the display medium 300 are well known to one ordinary skilled in the art, and thus no further description is provided herein.

Figure 1B:
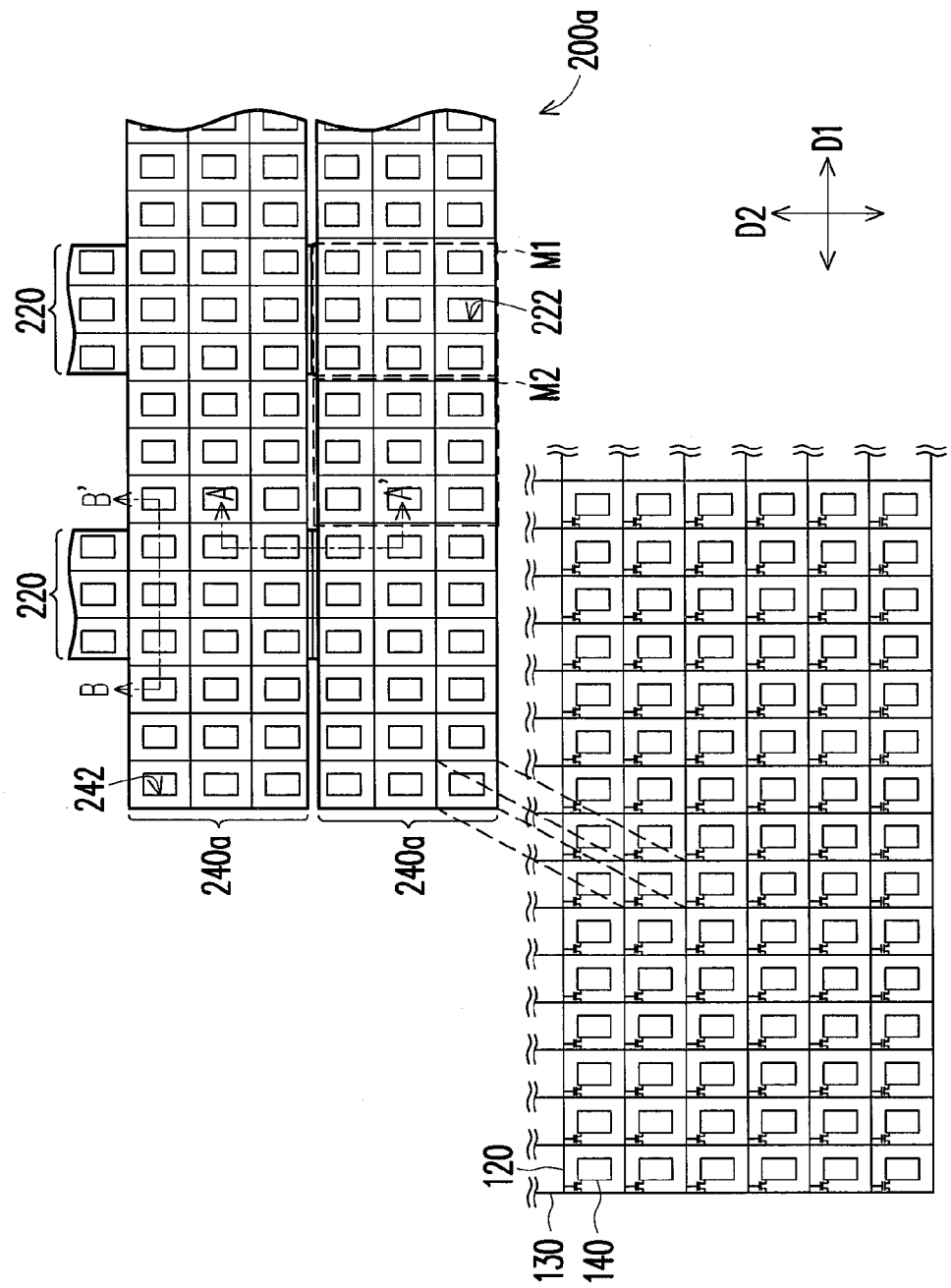
FIG. 1B is a schematic view illustrating an active device array substrate and a touch-sensing substrate of the touch-sensing display panel in FIG. 1A.
Figure 1C:
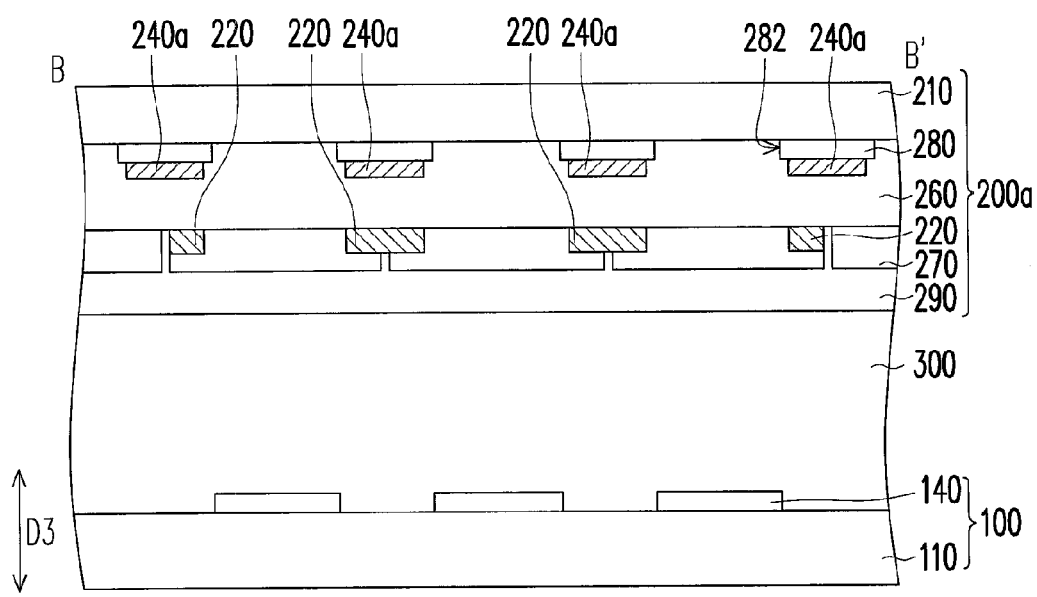
FIG. 1C is a cross-sectional view taken along a line B-B' depicted in FIG. 1B.

FIG. 1B is a schematic view illustrating an active device array substrate 100 and a touch-sensing substrate 200a of the touch-sensing display panel 10 in FIG. 1A. FIG. 1A is a cross-sectional view taken along a line A-A' depicted in FIG. 1B. FIG. 1C is a cross-sectional view taken along a line B-B' depicted in FIG. 1B. Referring to FIG. 1A, FIG. 1B and FIG. 1C, the active device array substrate 100 includes a second substrate 110, a plurality of scan lines 120, a plurality of data lines 130 and a plurality of pixel electrodes 140. The scan lines 120 are disposed over the second substrate 110 and extend along a first direction D1. The data lines 130 are disposed over the second substrate 110 and extend along a second direction D2, wherein the scan lines 120 are intersected with the data lines 130. The pixel electrodes 140 are disposed over the second substrate 110. In order to clear describe the relationship of the first touch-sensing electrodes 220, the second touch-sensing electrodes 240a and the active device array substrate 100, the first substrate 210, the dielectric layer 260, the black matrix 280 and the second substrate 110 are omitted in FIG. 1B. In this embodiment, the first touch-sensing electrodes 220 are parallel with each other and are disposed on the first substrate 210. The first touch-sensing electrodes 220 are disposed between the first substrate 210 and the active device array 100, wherein each of the first touch-sensing electrodes 220 has a plurality of first openings 222, respectively. In addition, the data lines 130 and the first touch-sensing electrodes 220 extend along a second direction D2, and the data lines 130 are substantially overlapped with the first touch-sensing electrodes 220 in a vertical direction D3. The material of the first touch-sensing electrodes 220 is, for example, metal, transparent conductive materials or other proper conductive materials. The above-mentioned metal includes aluminum (Al), copper (Cu), silver (Ag), gold (Au), titanium (Ti), molybdenum (Mo), tungsten (W), chromium (Cr), the alloys thereof or the stacked layers thereof. The above-mentioned transparent conductive materials includes indium tin oxide (ITO), indium zinc oxide (IZO), aluminum zinc oxide (AZO), the mixtures thereof or the stacked layers thereof.

In this embodiment, the second touch-sensing electrodes 240a are parallel with each other and are disposed on the first substrate 210. The second touch-sensing electrodes 240a are disposed between the first substrate 210 and the active device array 100, wherein each of the second touch-sensing electrodes 240a has a plurality of second openings 242, respectively. In addition, the second touch-sensing electrodes 240a extend along the first direction D1 and are intersected with the first touch-sensing electrodes 220. Further, the second touch-sensing electrodes 240a are electrically insulated from the first touch-sensing electrodes 220. The second touch-sensing electrodes 240a are substantially overlapped with the scan lines 120 in the vertical direction D3. The material of the second touch-sensing electrodes 240a is, for example, metal, transparent conductive materials or other proper conductive materials. In this embodiment, the first touch-sensing electrodes 220 and the second touch-sensing electrodes 240a are fabricated from different material layers, for example. In other words, the first touch-sensing electrodes 220 and the second touch-sensing electrodes 240a are located at different virtual planes.

Each of the first touch-sensing electrodes 220 has a plurality of first touch-sensing areas M1, each of the second touch-sensing electrodes 240a has a plurality of second touch-sensing areas M2. The first touch-sensing areas M1 of the first touch-sensing electrodes 220 overlaps with the second touch-sensing electrodes 240a while the second touch-sensing areas M2 of the second touch-sensing electrodes 240a do not overlap with the first touch-sensing electrodes 220. Accordingly, the first touch-sensing areas M1 are not overlapped with the second touch-sensing areas M2 in the vertical direction D3.

The dielectric layer 260 is, for example, disposed between the first touch-sensing electrodes 220 and the second touch-sensing electrodes 240a such that the second touch-sensing electrodes 240a are electrically insulated from the first touch-sensing electrodes 220. In an alternative embodiment (not shown), the dielectric layer 260 is exclusively disposed at intersections of the first touch-sensing electrodes 220 and the second touch-sensing electrodes 240a such that the second touch-sensing electrodes 240a are electrically insulated from the first touch-sensing electrodes 220. The materials of the dielectric layer 260 may be inorganic dielectric materials, organic dielectric materials or the stacked layers thereof. For example, the inorganic dielectric materials include silicon oxides, silicon nitrides, silicon oxy-nitrides, silicon carbides, silicon carbide oxides and so on. The organic dielectric materials include polyimide, acrylic resin and so on. The thickness of the dielectric layer 260 ranges from about 0.1 micrometer to about 20 micrometers.

The black matrix 280 is disposed between the first touch-sensing electrodes 220 and the first substrate 210. Also, the black matrix 280 is disposed between the second touch-sensing electrodes 240a and the first substrate 210. The black matrix 280 has a plurality of pixel openings 282 arranged in array, wherein each of the pixel openings 282 is corresponding to one of the first openings 222 or one of the second openings 242, respectively. In other words, since the first openings 222 and the second openings 242 are disposed corresponding to the pixel openings 282, the light emitted from the touch-sensing display panel 10 is not shielded by the first touch-sensing electrodes 220 and the second touch-sensing electrodes 240a. Accordingly, the display quality (e.g. brightness) of the touch-sensing display panel 10 does not deteriorate when the first touch-sensing electrodes 220 and the second touch-sensing electrodes 240a are integrated.

In this embodiment, the dimension of each of the pixel openings 282 is smaller than or substantially equal to the dimension of each of the first openings 222, and the dimension of each of the pixel openings 282 is smaller than or substantially equal to the dimension of each of the second openings 242. In addition, the dimension of each of the first openings 222 can be substantially equal to the dimension of each of the second openings 242. Since the dimension of each of the pixel openings 282 is smaller than or substantially equal to the dimension of each of the first openings 222 and the dimension of each of the second openings 242, the layout area occupied by the black matrix 280 is greater than or substantially equal to the layout area occupied by the first touch-sensing electrodes 220 and the second touch-sensing electrodes 240a. Each of the pixel electrodes 140 of the active device array substrate 100 is arranged corresponding to one of the pixel openings, respectively. Each of the pixel electrodes 140 is electrically connected to one of the scan lines 120 and one of the data lines 130 correspondingly via an active device, such as a thin film transistor. In this embodiment, since the first touch-sensing electrodes 220 and the second touch-sensing electrodes 240a are covered by the black matrix 280 entirely in the vertical direction D3, the aperture ratio of the touch-sensing display panel 10 is not affected by the first touch-sensing electrodes 220 and the second touch-sensing electrodes 240a.

In this embodiment, the touch-sensing substrate 200a may further include a plurality of color filters 270 and a planarization layer 290, wherein the color filters 270 are disposed over the first substrate 210, and the second touch-sensing electrodes 240a are disposed between the dielectric layer 260 and the color filters 270. The color filters 270 may be at least three primary colors color filters (e.g. red, green and blue color filters), and each of the color filters 270 are arranged corresponding to the pixel openings 282. The planarization layer 290 is disposed over the first substrate 210, wherein the color filters 270 are located between the dielectric layer 260 and the planarization layer 290. For example, the thickness of the color filters 270 ranges from about 0.1 micrometer to about 10 micrometers. The material of the planarization layer 290 may be polyimide, acrylic resin or other proper organic materials. The thickness of the planarization layer 290 ranges from about 0.1 micrometer to about 200 micrometers so as to reduce the capacitive coupling and cross-talk between the first touch-sensing electrodes 220 and the second touch-sensing electrodes 240a. Preferably, the thickness of the planarization layer 290 ranges from about 2 micrometer to about 20 micrometers.

Other alternative embodiments are illustrated as follows. It should be mentioned that the reference numbers and some of the descriptions in the previous embodiment are applicable in the following embodiments. Identical or similar components in the previous and following embodiments are denoted by identical reference numbers, and the same descriptions in the previous and following embodiments are not reiterated herein. In order to clearly describe the technical feature of the disclosure, only the touch-sensing substrate is disclosed in detail. Descriptions of the display medium and active device array substrate are thus omitted. Specifically, these identical or similar components can be learned from the explanation in the previous embodiment, and thus no other description is provided below.

Figure 2A:
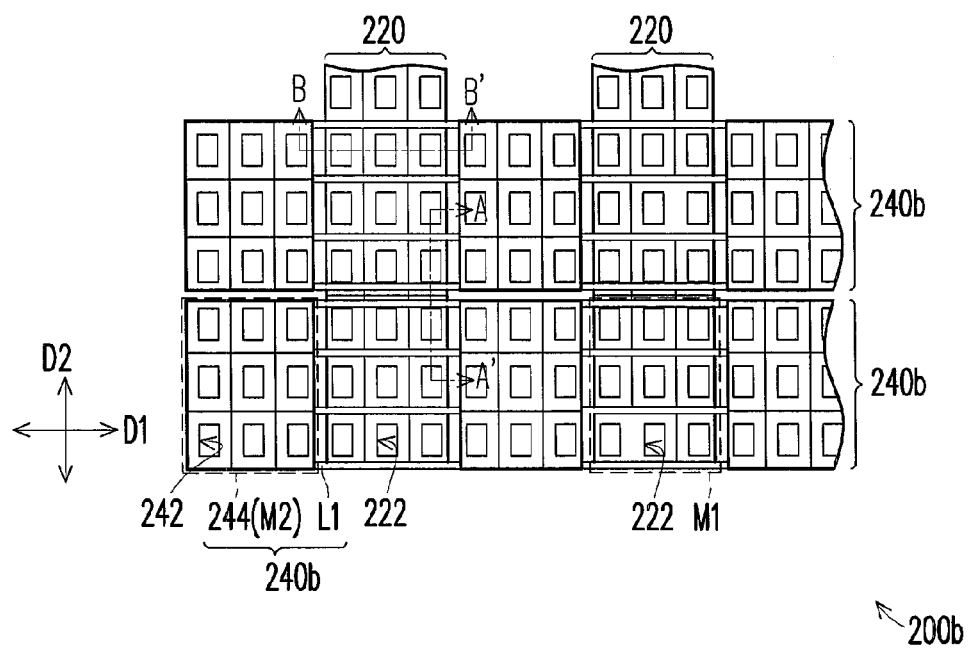
FIG. 2A is a schematic view of a touch-sensing substrate in the touch-sensing display panel according to the second embodiment of the present invention.
Figure 2B:
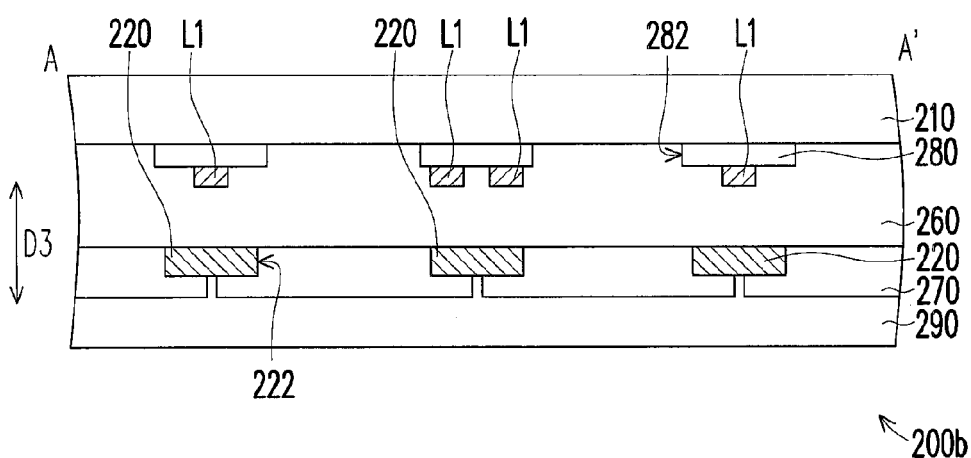
FIG. 2B is a cross-sectional view taken along a line A-A' depicted in FIG. 2A.
Figure 2C:
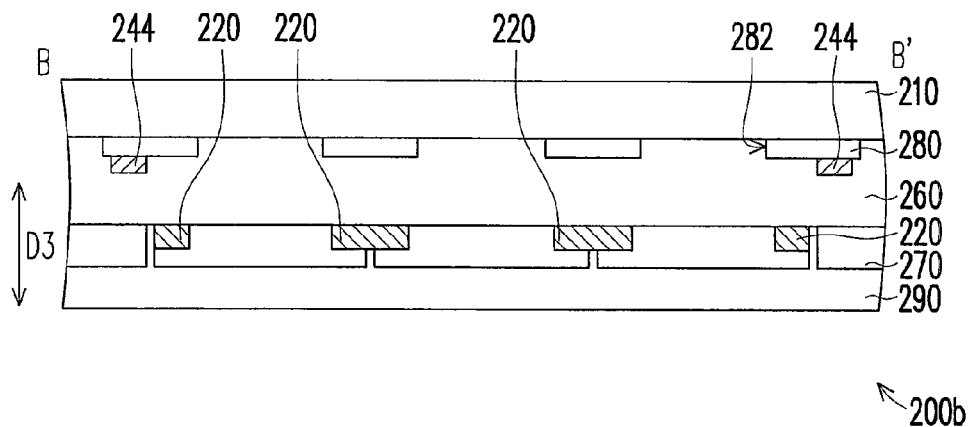
FIG. 2C is a cross-sectional view taken along a line B-B' depicted in FIG. 2A.

FIG. 2A is a schematic view of a touch-sensing substrate 200b in the touch-sensing display panel according to the second embodiment of the present invention. FIG. 2B is a cross-sectional view taken along a line A-A' depicted in FIG. 2A. FIG. 2C is a cross-sectional view taken along a line B-B' depicted in FIG. 2A. It is noted that only the first touch-sensing electrodes 220 and the second touch-sensing electrodes 240b are illustrated accompany with FIG. 2A, descriptions of other elements are omitted. Referring to FIG. 2A, FIG. 2B and FIG. 2C, the touch-sensing substrate 200b of this embodiment is similar with the touch-sensing substrate 200a in FIG. 1B except that the pattern of the second touch-sensing electrodes 240b. Specifically, each of the first touch-sensing electrodes 220 can be a bar-shaped electrode having the plurality of first openings 222. Each of the second touch-sensing electrodes 240b includes a plurality of touch-sensing pads 244 having the second openings 242 and a plurality of first bridge lines L1 electrically connected between neighboring touch-sensing pads 244. The first touch-sensing electrodes 220 are intersected with the first bridge lines L1. Specifically, each of the first bridge lines L1 is intersected with only one of the first touch-sensing electrodes 220. In this embodiment, the touch-sensing pads 244 and the first bridge lines L1 are fabricated from a same material layer while the first touch-sensing electrodes 220 and the second touch-sensing electrodes 240a are fabricated from different material layers. In other words, the first touch-sensing electrodes 220 and the second touch-sensing electrodes 240b are located at different virtual planes. In addition, the touch-sensing pads 244 and the first bridge lines L1 are fabricated simultaneously, and the neighboring touch-sensing pads 244 are electrically connected to each other through the first bridge lines L1. Preferably, each of the first touch-sensing electrodes 220 and each of the second touch-sensing electrodes 240b are bar-shaped electrodes. Since it is easy to align the bar-shaped electrodes with the black matrix 280, the process window increases and the aperture ratio of touch-sensing display panel is not significantly affected by misalignment between the bar-shaped electrodes and the black matrix 280.

Further, the position of the first bridge lines L1 is corresponding to the position of the black matrix 280, and the width of each of the first bridge lines L1 is smaller or substantially equal to the width of the black matrix 280 corresponding thereto. Since the first bridge lines L1 are covered by the black matrix 280 entirely, the aperture ratio of the touch-sensing display panel 10 is not affected.

In this embodiment, the first touch-sensing areas M1 of the first touch-sensing electrodes 220 overlaps with the second touch-sensing electrodes 240b while the second touch-sensing areas M2 of the second touch-sensing electrodes 240b are defined by touch-sensing pads 224. The first touch-sensing areas M1 are not overlapped with the second touch-sensing areas M2 in the vertical direction D3.

Specifically, since the second touch-sensing electrodes 240b includes touch-sensing pads 244 and first bridge lines L1 electrically connected between neighboring touch-sensing pads 244, the overlap area of the first touch-sensing electrodes 220 and the second touch-sensing electrodes 240b is substantially equal to the overlap area of the first bridge lines L1 and the first touch-sensing electrodes 220. In this case, the capacitive coupling and cross-talk between the first touch-sensing electrodes 220 and the second touch-sensing electrodes 240b, since the overlap area of the first bridge lines L1 and the first touch-sensing electrodes 220 is reduced.

Figure 2D:
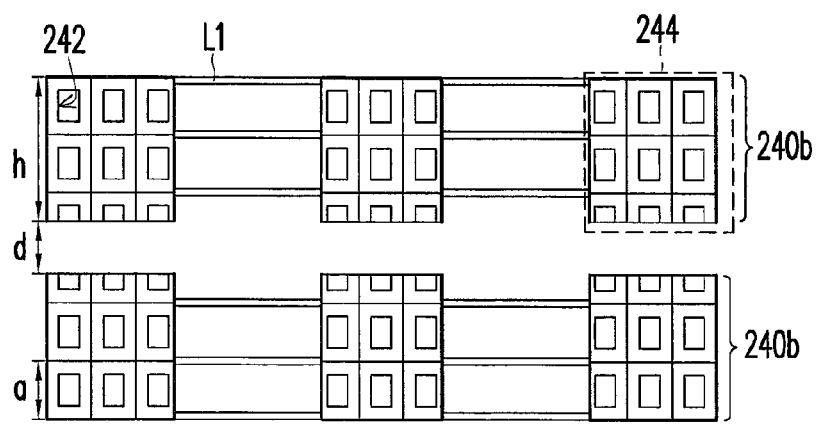
FIG. 2D is a schematic view of second touch-sensing electrodes in the touch-sensing substrate according to the present invention.
Figure 2E:
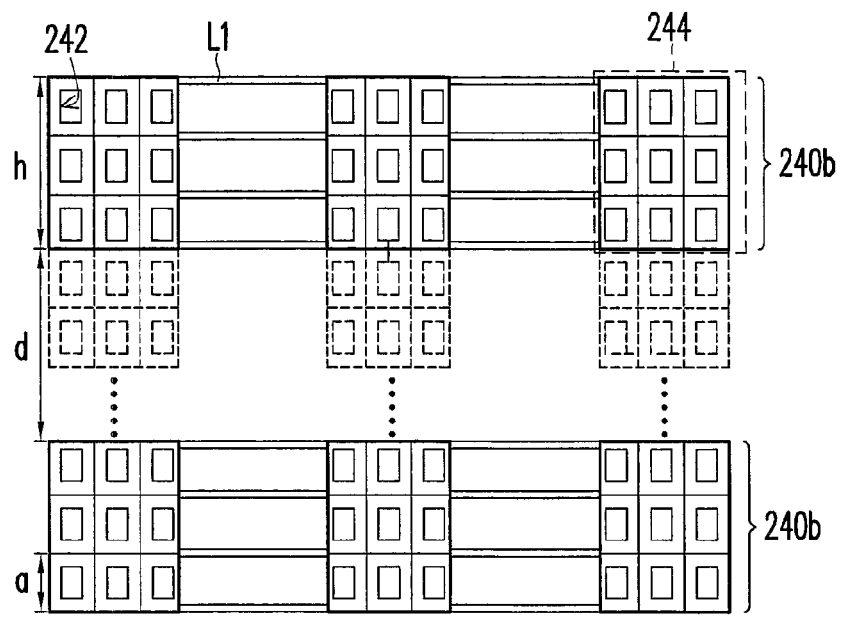
FIG. 2E is another schematic view of second touch-sensing electrodes in the touch-sensing substrate according to the present invention.

It is noted that the second touch-sensing electrodes 240b of this embodiment are arranged periodically and closely. However, the invention is not limited thereto. In other embodiments, the gap d between two neighboring second touch-sensing electrodes 240b may not be an integral multiple of the length a of one pixel unit (shown in FIG. 2D). In another embodiments, the gap d between two neighboring second touch-sensing electrodes 240b may be an integral multiple of the length a of one pixel unit (shown in FIG. 2E). Further, the width h of the second touch-sensing electrodes 240b may not be an integral multiple of the length a of one pixel unit. As shown in FIG. 2D, the width h of the second touch-sensing electrodes 240b is 2.5 times of the length a of one pixel unit. In another embodiments, the gap d between two neighboring second touch-sensing electrodes 240b may be an integral multiple of the length a of one pixel unit. As shown in FIG. 2E, the width h of the second touch-sensing electrodes 240b is 3 times of the length a of one pixel unit. The number of the first bridge lines L1 is not limited in this embodiment, as long as all the first bridge lines L1 can be entirely covered by the black matrix 280. More specifically, the gap d between two neighboring second touch-sensing electrodes 240b, the width h of the second touch-sensing electrodes 240b and the number of the first bridge lines L1 can be modified according to design requirements so as to optimize sensitivity of touch-sensing.

Figure 3A:
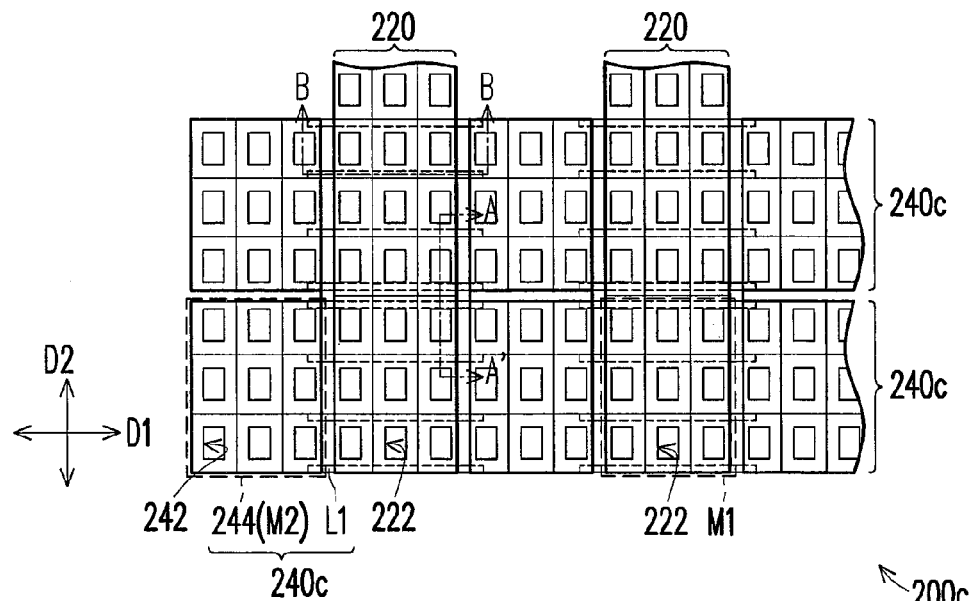
FIG. 3A is a schematic view of a touch-sensing substrate in the touch-sensing display panel according to the third embodiment of the present invention.
Figure 3B:
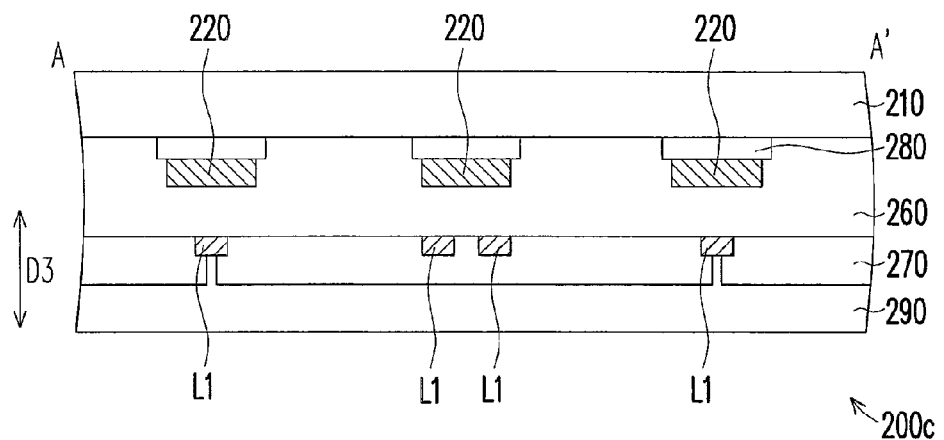
FIG. 3B is a cross-sectional view taken along a line A-A' depicted in FIG. 3A.
Figure 3C:
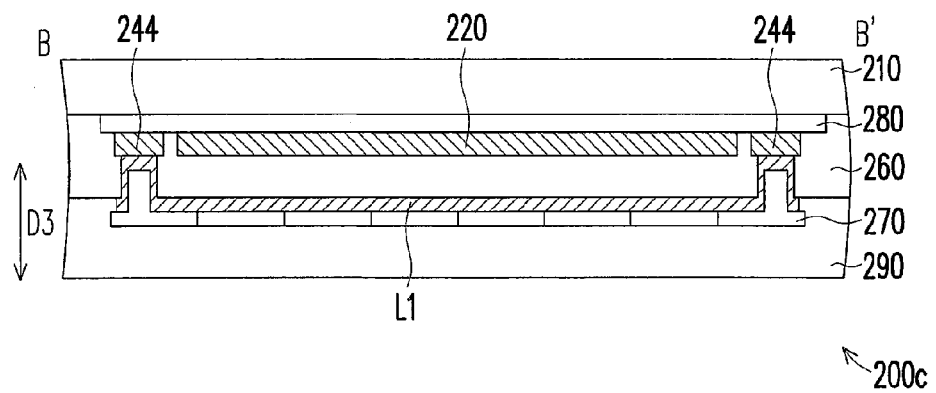
FIG. 3C is a cross-sectional view taken along a line B-B' depicted in FIG. 3A.

FIG. 3A is a schematic view of a touch-sensing substrate in the touch-sensing display panel 200c according to the third embodiment of the present invention. FIG. 3B is a cross-sectional view taken along a line A-A' depicted in FIG. 3A. FIG. 3C is a cross-sectional view taken along a line B-B' depicted in FIG. 3A. It is noted that only the first touch-sensing electrodes 220 and the second touch-sensing electrodes 240c are illustrated accompany with FIG. 3A, descriptions of other elements are omitted. Referring to FIG. 3A, FIG. 3B and FIG. 3C, the touch-sensing substrate 200c of this embodiment is similar with the touch-sensing substrate 200b in FIG. 2A except that the touch-sensing pads 244 and the first bridge lines L1 are fabricated from different material layers while the first touch-sensing electrodes 220 and the second touch-sensing electrodes 240c can be fabricated from a same material layer. In other words, the first touch-sensing electrodes 220 and the second touch-sensing electrodes 240c are located at the same virtual planes. Each of the first bridge lines L1 is intersected with one first touch-sensing electrode 220. Each of the first bridge lines L1 is electrically connected to the neighboring touch-sensing pads 244. More specifically, since the first bridge lines L1 of the second touch-sensing electrodes 240c cross the first touch-sensing electrodes 220 and are electrically connected the neighboring touch-sensing pads 244, the first touch-sensing electrodes 220 are only overlapped with the first bridge lines L1 in the vertical direction D3 (similar with FIG. 2A).

Figure 4A:
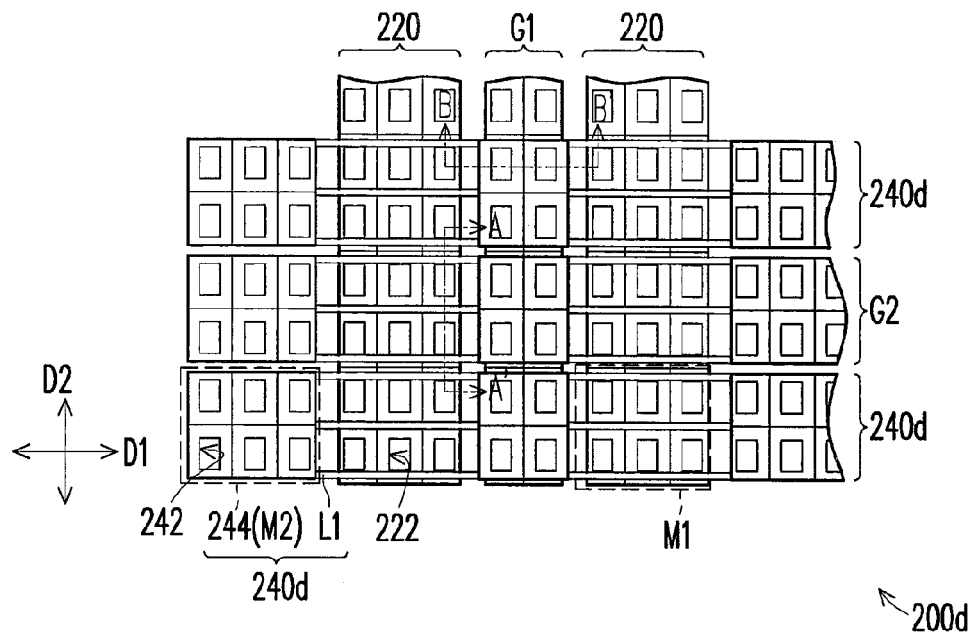
FIG. 4A is a schematic view of a touch-sensing substrate in the touch-sensing display panel according to the fourth embodiment of the present invention.
Figure 4B:
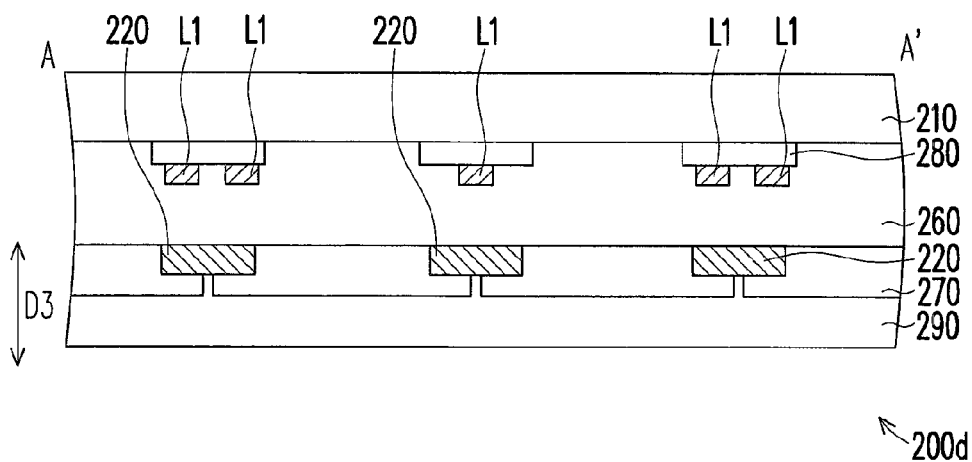
FIG. 4B is a cross-sectional view taken along a line A-A' depicted in FIG. 4A.
Figure 4C:
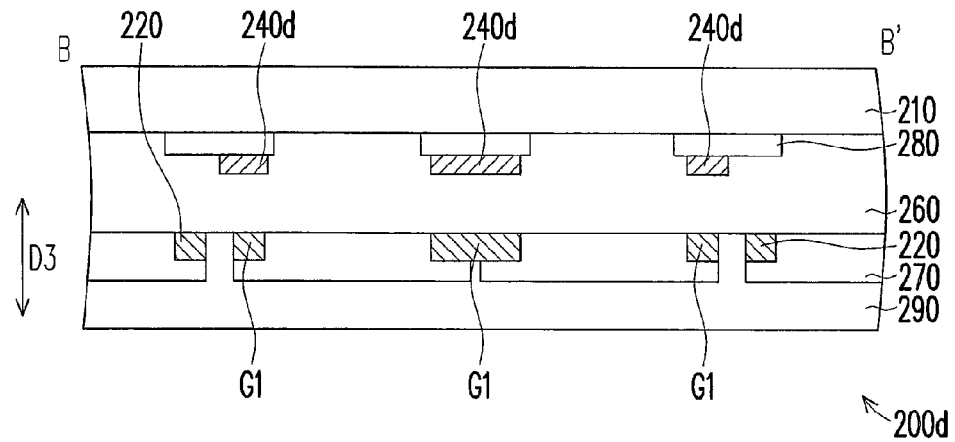
FIG. 4C is a cross-sectional view taken along a line B-B' depicted in FIG. 4A.

FIG. 4A is a schematic view of a touch-sensing substrate in the touch-sensing display panel 200d according to the fourth embodiment of the present invention. FIG. 4B is a cross-sectional view taken along a line A-A' depicted in FIG. 4A. FIG. 4C is a cross-sectional view taken along a line B-B' depicted in FIG. 4A. It is noted that only the first touch-sensing electrodes 220 and the second touch-sensing electrodes 240d are illustrated accompany with FIG. 4A, descriptions of other elements are omitted. Referring to FIG. 4A, FIG. 4B and FIG. 4C, the touch-sensing substrate 200d of this embodiment is similar with the touch-sensing substrate 200b in FIG. 2A except that the touch-sensing substrate 200d includes a plurality of first ground electrodes G1 and a plurality of second ground electrodes G2. It is noted that the first ground electrodes G1 and the first touch-sensing electrodes 220 are fabricated from the same material layer while the second ground electrodes G2 and the second touch-sensing electrodes 240d are fabricated from the same material layer. For example, each of the first ground electrodes G1 is located between two neighboring first touch-sensing electrodes 220, respectively. Each of the second ground electrodes G2 is located between two neighboring second touch-sensing electrodes 240d, respectively. Each of the first bridge lines L1 is intersected with at least two of the first touch-sensing electrodes 220 and one of the first ground electrodes G1. Further, the first ground electrodes G1 are not overlapped with the touch-sensing pads 244 of the second touch-sensing electrodes 240d. The first ground electrodes G1 can reduce cross-talk occurred between the neighboring first touch-sensing electrodes 220 while the second ground electrodes G2 can reduce cross-talk occurred between the neighboring second touch-sensing electrodes 240d, since the first ground electrodes G1 and the second ground electrodes G2 are grounded.

Figure 5A:
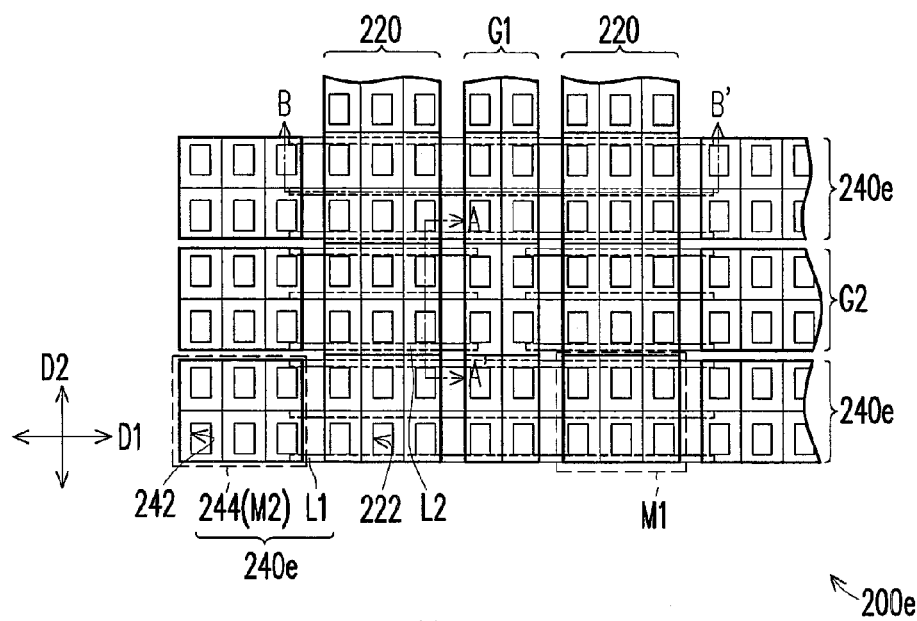
FIG. 5A is a schematic view of a touch-sensing substrate in the touch-sensing display panel according to the fifth embodiment of the present invention.
Figure 5B:
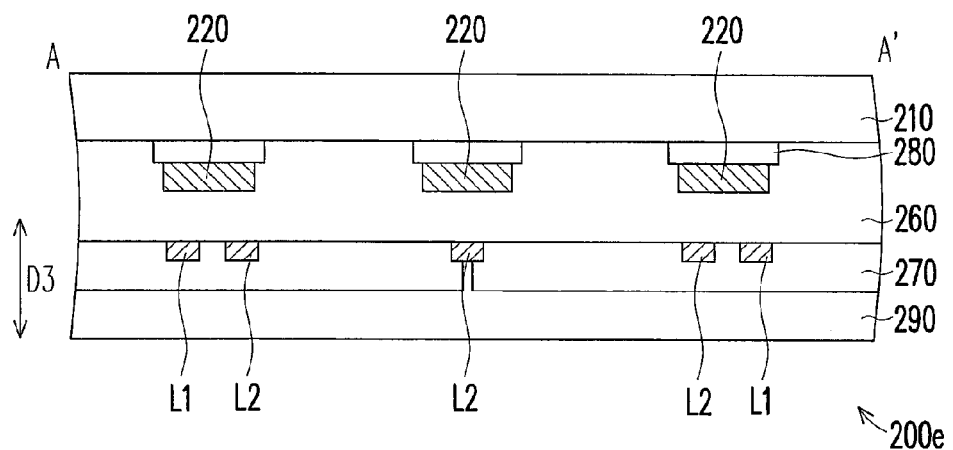
FIG. 5B is a cross-sectional view taken along a line A-A' depicted in FIG. 5A.
Figure 5C:
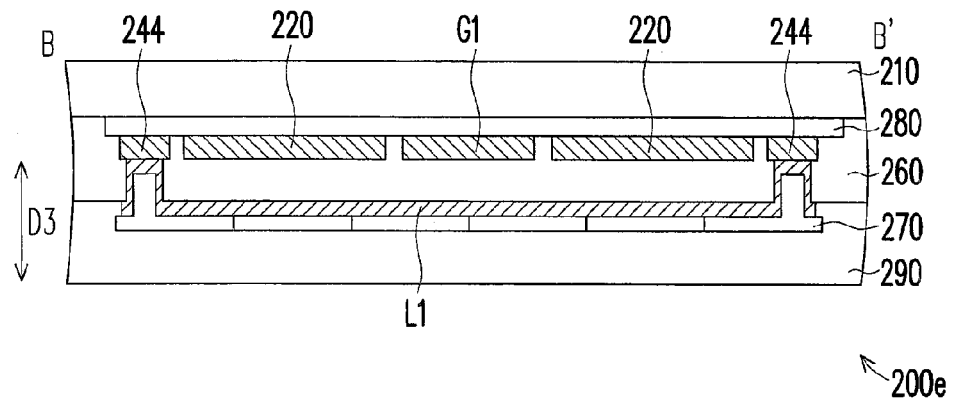
FIG. 5C is a cross-sectional view taken along a line B-B' depicted in FIG. 5A.

FIG. 5A is a schematic view of a touch-sensing substrate in the touch-sensing display panel 200e according to the fifth embodiment of the present invention. FIG. 5B is a cross-sectional view taken along a line A-A' depicted in FIG. 5A. FIG. 5C is a cross-sectional view taken along a line B-B' depicted in FIG. 5A. It is noted that only the first touch-sensing electrodes 220 and the second touch-sensing electrodes 240e are illustrated accompany with FIG. 5A, descriptions of other elements are omitted. Referring to FIG. 5A, FIG. 5B and FIG. 5C, the touch-sensing substrate 200e of this embodiment is similar with the touch-sensing substrate 200d in FIG. 4A except that the touch-sensing pads 244 and the first bridge lines L1 are fabricated from different material layers while the first touch-sensing electrodes 220 and the second touch-sensing electrodes 240e are fabricated from the same material layer. In addition, the touch-sensing substrate 200e of this embodiment further includes a plurality of second bridge lines L2, wherein the second bridge lines L2 are intersected with the first touch-sensing electrodes 220. Specifically, the first ground electrodes G1 of the touch-sensing substrate 200e can reduce cross-talk occurred between the neighboring first touch-sensing electrodes 220 while the second ground electrodes G2 can reduce cross-talk occurred between the neighboring second touch-sensing electrodes 240e. Besides, the neighboring touch-sensing pads 244 are electrically connected to each other through the first bridge lines L1 while the first ground electrodes G1 are electrically connected to the second ground electrodes G2 through a plurality of second bridge lines L2.

Figure 6A:
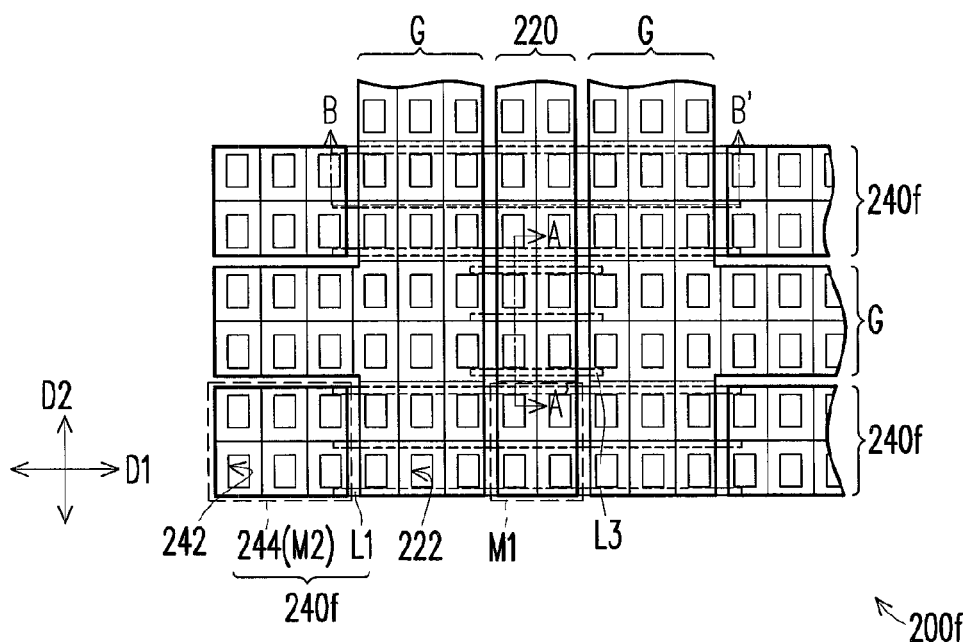
FIG. 6A is a schematic view of a touch-sensing substrate in the touch-sensing display panel according to the sixth embodiment of the present invention.
Figure 6B:
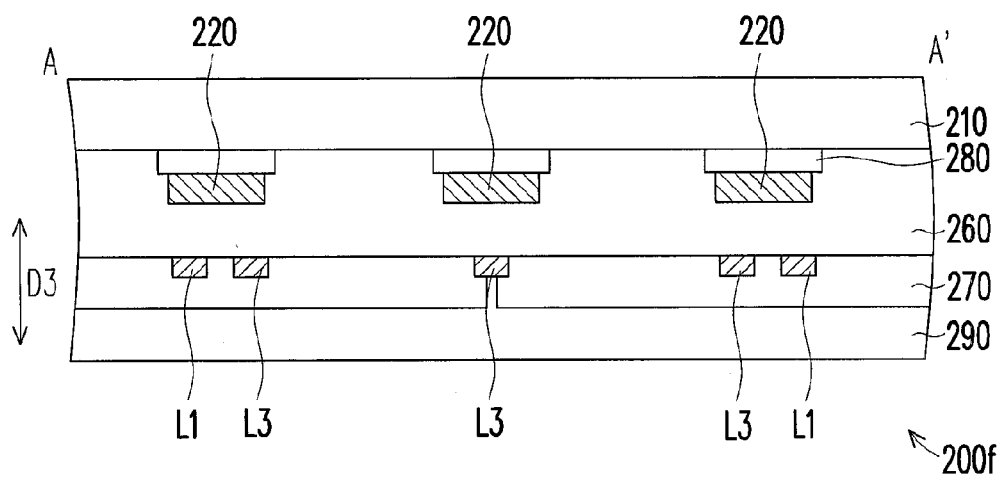
FIG. 6B is a cross-sectional view taken along a line A-A' depicted in FIG. 6A.
Figure 6C:
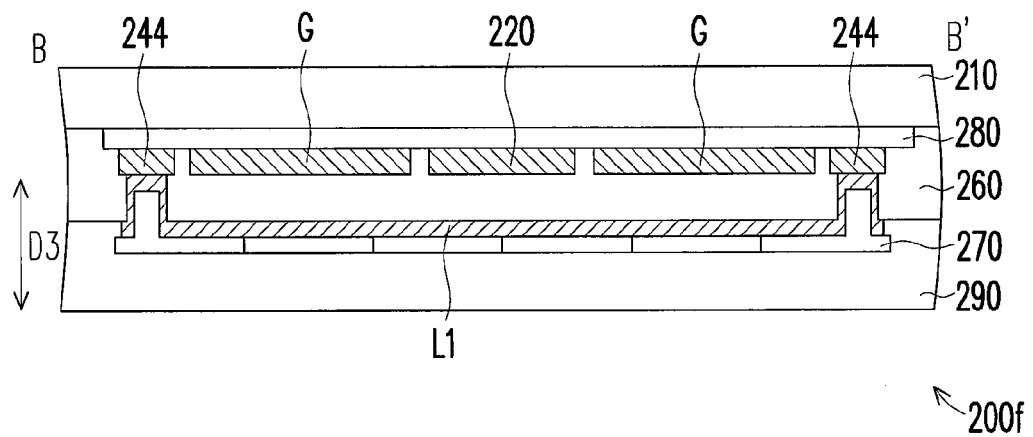
FIG. 6C is a cross-sectional view taken along a line B-B' depicted in FIG. 6A.

FIG. 6A is a schematic view of a touch-sensing substrate in the touch-sensing display panel 200f according to the sixth embodiment of the present invention. FIG. 6B is a cross-sectional view taken along a line A-A' depicted in FIG. 6A. FIG. 6C is a cross-sectional view taken along a line B-B' depicted in FIG. 6A. It is noted that only the first touch-sensing electrodes 220 and the second touch-sensing electrodes 240f are illustrated accompany with FIG. 6A, descriptions of other elements are omitted. Referring to FIG. 6A, FIG. 6B and FIG. 6C, the touch-sensing substrate 200f of this embodiment includes a plurality of ground electrodes G, wherein the ground electrodes G are located between two neighboring first touch-sensing pads 244 and between the touch-sensing pads 244 and the first touch-sensing electrodes 220. Accordingly, the ground electrodes G can reduce cross-talk occurred between the neighboring touch-sensing pads 244 and cross-talk occurred between the touch-sensing pads 244 and the first touch-sensing electrodes 220. Furthermore, the ground electrodes G, the first touch-sensing electrodes 220 and the second touch-sensing electrodes 240f are fabricated from the same material layer and are located at the same virtual plane. Besides, the ground electrodes G are electrically connected to each other through a plurality of third bridge lines L3 while the neighboring touch-sensing pads 244 are electrically connected to each other through the first bridge lines L1.

The touch-sensing display panel of the above mentioned embodiments may be formed by deposition, photolithography and etch processes. The detailed process flow is known by one ordinary skilled in the art and is thus omitted in this disclosure. The touch-sensing display panel of this disclosure may be a mutual-type capacitive touch-sensing display panel. Specifically, the first touch-sensing electrodes 220 serve as driving electrodes while the second touch-sensing electrodes 240a-240f serve as response electrodes. When the mutual-type capacitive touch-sensing display panel is touched by objects (e.g. fingers of users or stylus), the capacitive coupling between the driving electrodes and the response electrodes located at the position being touched changes. Accordingly, the position being touched is determined by the change of capacitance between the driving electrodes and the response electrodes. In an alternative embodiment, the first touch-sensing electrodes 220 serve as response electrodes while the second touch-sensing electrodes 240a-240f serve as driving electrodes so as to achieve similar touch-sensing function. The touch-sensing display panel of this disclosure may be a self-type capacitive touch-sensing display panel. Specifically, driving signals are respectively applied to the first touch-sensing electrodes 220 and the second touch-sensing electrodes 240a-240f. When the self-type capacitive touch-sensing display panel is touched by objects (e.g. fingers of users or stylus), the capacitive coupling between the driving electrodes and the detection electrodes located at the position being touched changes. Accordingly, the position being touched is determined by the change of capacitance between the driving electrodes and the detection electrodes. The detailed descriptions of the driving method are well known to one ordinary skilled in the art, and thus no further description is provided herein.

In this disclosure, design of openings, bridge lines and/or ground electrodes can reduce cross-talk between touch-sensing electrodes effectively. Since the above-mentioned openings are arranged corresponding to the pixel openings, the formation of the touch-sensing electrodes does not deteriorate the display quality (brightness) of the touch-sensing display panel. Further, since the position of the touch-sensing electrodes is corresponding to the position of the black matrix, the touch-sensing electrodes are entirely covered by the black matrix. In other words, aperture ratio of the touch-sensing display panel is almost not affected by the touch-sensing electrodes. The display quality of the touch-sensing display panel is almost not affected by the touch-sensing substrate. In another aspect, since the built-in touch-sensing electrodes having openings are intersected with each other and cover the substrate, the touch-sensing electrodes are capable of functioning as an electrical shielding layer so as to reduce interference. Specifically, when the touch-sensing display panel is touched by fingers of users or stylus, an electrical field is generated and the optical characteristic of display medium is interfered thereby. At this time, the electrical shielding layer can shield or reduce the electrical field resulted from the fingers of users or stylus. Since the touch-sensing electrodes of the touch-sensing substrate can shield or reduce the electrical field resulted from the fingers of users or stylus, fabrication of additional electrical shielding layer is not required. In this disclosure, the touch-sensing display panel having touch-sensing substrate has favorable sensitivity.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A touch-sensing display panel, comprising:
an active device array substrate;
a touch-sensing substrate, comprising:
    a first substrate;
    a plurality of first touch-sensing electrodes parallel with each other and disposed on the first substrate, wherein each of the first touch-sensing electrodes is a bar-shaped electrode having a plurality of first openings, respectively;
    a plurality of second touch-sensing electrodes parallel with each other and disposed on the first substrate, the second touch-sensing electrodes being between the first substrate and the second substrate, wherein the second touch-sensing electrodes are intersected with and are electrically insulated from the first touch-sensing electrodes, and each of the second touch-sensing electrodes includes a plurality of touch-sensing pads respectively having a plurality of second openings, and a plurality of first bridge lines electrically connected between neighboring touch-sensing pads, wherein each of the first bridge lines is intersected with at least two of the first touch-sensing electrodes between two adjacent second touch-sensing electrodes, and wherein each of the first touch-sensing electrodes has a plurality of first touch-sensing areas, each of the second touch-sensing electrodes has a plurality of second touch-sensing areas, wherein the first touch-sensing areas of the first touch-sensing electrodes overlap with the second touch-sensing electrodes while the second touch-sensing areas of the second touch-sensing electrodes do not overlap with the first touch-sensing electrodes, and the first touch-sensing electrodes located in the first touch-sensing areas have openings;
    a dielectric layer disposed at intersections of the first touch-sensing electrodes and the second touch-sensing electrodes, wherein the second touch-sensing electrodes are electrically insulated from the first touch-sensing electrodes;
    a black matrix disposed between the first touch-sensing electrodes and the first substrate, the black matrix being disposed between the second touch-sensing electrodes and the first substrate, wherein the black matrix has a plurality of pixel openings arranged in array, each of the pixel openings is corresponding to one of the first openings or one of the second openings, respectively; and a display medium layer disposed between the active device array substrate and the touch-sensing substrate.

2. The touch-sensing display panel of claim 1, wherein the active device array substrate comprises:
a second substrate;
a plurality of scan lines disposed on the second substrate;
a plurality of data lines disposed on the second substrate, wherein the scan lines are intersected with the data lines; and
a plurality of pixel electrodes disposed over the second substrate, each of the pixel electrodes being corresponding to one of the pixel openings respectively, wherein each of the pixel electrodes is electrically connected to one of the scan lines and one of the data lines correspondingly.

3. The touch-sensing display panel of claim 2, wherein the scan lines and the second touch-sensing electrodes extend along a first direction, the scan lines are substantially overlapped with the second touch-sensing electrodes in a vertical direction, the data lines and the first touch-sensing electrodes extend along a second direction, and the data lines are substantially overlapped with the first touch-sensing electrodes in the vertical direction.

4. The touch-sensing display panel of claim 1, wherein a dimension of each of the pixel openings is smaller than or substantially equal to a dimension of each of the first openings, and the dimension of each of the pixel openings is smaller than or substantially equal to a dimension of each of the second openings.

5. The touch-sensing display panel of claim 4, wherein the dimension of each of the first openings is substantially equal to the dimension of each of the second openings.

6. The touch-sensing display panel of claim 1, wherein a position of the first bridge lines is corresponding to a position of the black matrix.

7. The touch-sensing display panel of claim 6, wherein a width of each of the first bridge lines is smaller or substantially equal to a width of the black matrix corresponding thereto.

8. The touch-sensing display panel of claim 6, wherein the touch-sensing pads and the first bridge lines are fabricated from a same material layer while the first touch-sensing electrodes and the second touch-sensing electrodes are fabricated from different material layers.

9. The touch-sensing display panel of claim 6, wherein the touch-sensing pads and the first bridge lines are fabricated from different material layers while the first touch-sensing electrodes and the second touch-sensing electrodes are fabricated from a same material layer.

10. The touch-sensing display panel of claim 6, further comprising:
a plurality of first ground electrodes, each of the first ground electrodes being located between two neighboring first touch-sensing electrodes, respectively; and
a plurality of second ground electrodes, each of the second ground electrodes being located between two neighboring second touch-sensing electrodes respectively, wherein each of the first bridge lines is intersected with at least two of the first touch-sensing electrodes and one of the first ground electrodes.

11. The touch-sensing display panel of claim 10, wherein the first ground electrodes are electrically connected to the second ground electrodes through a plurality of second bridge lines, and the second bridge lines are intersected with the first touch-sensing electrodes.

12. The touch-sensing display panel of claim 6, further comprising:
a plurality of ground electrodes, located between two neighboring first touch-sensing pads and between the touch-sensing pads and the first touch-sensing electrodes.

13. The touch-sensing display panel of claim 12, wherein the ground electrodes are electrically connected to each other through a plurality of third bridge lines.

14. The touch-sensing display panel of claim 1, further comprising a plurality of color filters disposed on the first substrate and arranged corresponding to the pixel openings.

15. The touch-sensing display panel of claim 1, wherein the first touch-sensing electrodes and the second touch-sensing electrodes are covered by the black matrix entirely in a vertical direction.

16. The touch-sensing display panel of claim 1, wherein the first touch-sensing areas are not overlapped with the second touch-sensing areas in a vertical direction.

17. The touch-sensing display panel of claim 1, wherein the display medium comprises liquid crystal materials, electrophoretic materials, organic luminescent materials, inorganic luminescent materials, fluorescence materials, phosphorescence materials, or plasma display materials.

* * * * *